United States Patent
Chikaraishi

(10) Patent No.: US 7,284,635 B2
(45) Date of Patent: Oct. 23, 2007

(54) ELECTRIC POWER STEERING DEVICE

(75) Inventor: Kazuo Chikaraishi, Gunma-ken (JP)

(73) Assignee: NSK, Ltd., Tokyo (JP)

( * ) Notice: Subject to any disclaimer, the term of this patent is extended or adjusted under 35 U.S.C. 154(b) by 282 days.

(21) Appl. No.: 10/512,999

(22) PCT Filed: Jun. 2, 2003

(86) PCT No.: PCT/JP03/06926

§ 371 (c)(1),
(2), (4) Date: Oct. 29, 2004

(87) PCT Pub. No.: WO03/104065

PCT Pub. Date: Dec. 18, 2003

(65) Prior Publication Data
US 2005/0236222 A1    Oct. 27, 2005

(30) Foreign Application Priority Data
Jun. 6, 2002    (JP) .............................. 2002-165870

(51) Int. Cl.
*B62D 5/04*    (2006.01)
(52) U.S. Cl. ..................................................... 180/444
(58) Field of Classification Search ................ 180/443, 180/444, 445, 446
See application file for complete search history.

(56) References Cited

U.S. PATENT DOCUMENTS 6,364,049 B1 * 4/2002 Iwasaki et al. ............. 180/444
6,394,220 B1   5/2002 Kurokawa et al.
2001/0002630 A1 * 6/2001 Watanabe et al. .......... 180/444

FOREIGN PATENT DOCUMENTS

| CA | 2312156     | 12/2000 |
|----|-------------|---------|
| EP | 1065133     | 1/2001  |
| EP | 1 090 827 A2| 4/2001  |
| EP | 1 106 474 A2| 6/2001  |
| JP | 11-59441    | 3/1999  |
| JP | 2000-146721 | 5/2000  |
| JP | 2000-177611 | 6/2000  |
| JP | 2001-10515  | 1/2001  |
| JP | 2001-108024 | 4/2001  |
| JP | 2001-163229 | 6/2001  |

* cited by examiner

*Primary Examiner*—Kevin Hurley
(74) *Attorney, Agent, or Firm*—Miles & Stockbridge PC

(57) ABSTRACT

An electric power steering apparatus comprises a steering shaft including an input shaft connected to a steering wheel, an output shaft connected to a steering gear device, a torsion bar for transferring torque to the output shaft from the input shaft, the steering shaft being rotatably supported in a steering column, torque detection coils disposed outwards along an outer periphery of the steering shaft, and a worm wheel meshing with a worm rotationally driven by a motor driven corresponding to detected torque and fixed to the output shaft in terms of its rotation, wherein the steering shaft is rotatably supported via a bearing provided between the worm wheel and a column-sided member on the front side of the vehicle.

7 Claims, 7 Drawing Sheets

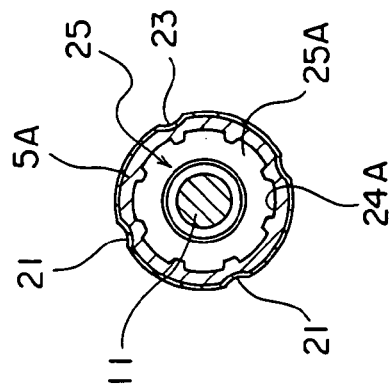
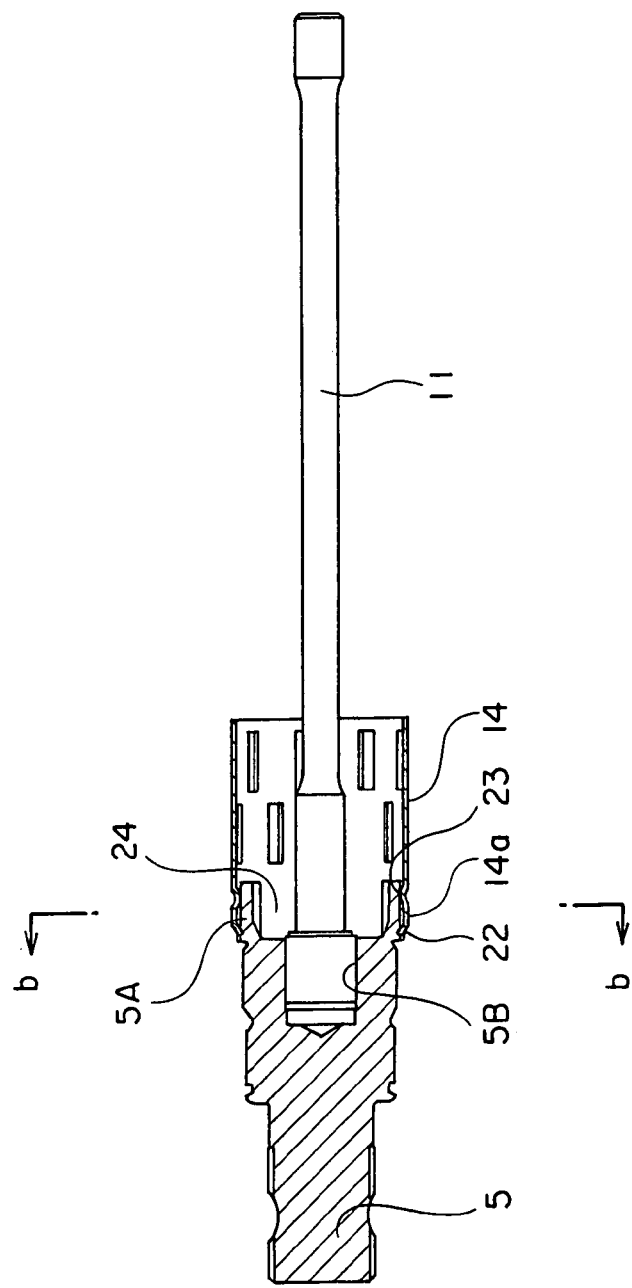

ELECTRIC POWER STEERING DEVICE

TECHNICAL FIELD

The present invention relates to an electric power steering apparatus contrived to reduce a length in an axial direction.

BACKGROUND ARTS

In an electric power steering apparatus according to the prior art shown in FIG. 8, a lower column 102 is fitted in a vehicle-front-sided portion of an upper column 101 of a steering column, and an upper shaft 103 and a lower shaft (input shaft) 104 of a steering shaft that are spline-fitted to each other are rotatably supported in these columns 101 and 102.

An output shaft 105 is connected via a stopper portion 106 to a vehicle-front-sided portion of the lower shaft (input shaft) 104. A steering gear (unillustrated) is connected via a universal joint (unillustrated), etc. to a vehicle-front-sided portion of this output shaft 105.

The output shaft 105 is supported in housing 109 and in housing 110 through a pair of bearings 107, 108. A proximal end of a torsion bar 111 is fixedly press-fitted in a vehicle-front-sided portion of the lower shaft (input shaft) 104. This torsion bar 111 extends through an interior of the hollowed output shaft 105, and its front end is fixed to an end portion of the output shaft 105 by a fixing pin 112.

Torque detection grooves 113 are formed in the vehicle-rear-sided portion of the output shaft 105. A sleeve 114 of a torque sensor is disposed outwards in a radial direction of these grooves 113. A vehicle rear-sided end portion of this sleeve 114 is fixed to the vehicle-front-sided end portion of the lower shaft (input shaft) 104 by caulking or the like. Coils 115, a board, etc. are provided outwards in a radial direction of the sleeve 114.

The output shaft 105 is fitted with a worm wheel 118 meshing with a worm 117 defined as a drive shaft of an electric motor 116.

Accordingly, a steering force generated when a driver steers the steering wheel (unillustrated) is transferred to unillustrated steered travelling wheels via the input shaft 104, the torsion bar 111, the output shaft 105 and a rack-and-pinion steering gear device. Further, a rotational force of the electric motor 116 is transferred to the output shaft 105 via the worm 117 and the worm wheel 118. An adequate amount of steering auxiliary torque can be applied to the output shaft 105 by properly controlling the rotational force and a rotational direction of the electric motor 116.

As described above, in the electric power steering apparatus shown in FIG. 8, the sleeve 114 takes a structure that the vehicle rear-sided portion of the sleeve 114 is fixed to the vehicle front-sided end portion of the lower shaft (input shaft) 104, and hence axis-directional lengths of the housing 109 and of the housing 110 for the electric power steering are comparatively taken long.

As a result, the axis-directional lengths of the housing 109 and of the housing 110 specify a collapse/stroke quantity of the upper column 101 when a secondary collision of the vehicle happens. Therefore, the collapse/stroke quantity can not be increased over the stroke quantity shown in FIG. 8 in spite of a demand for increasing this stroke quantity.

Further, in the electric power steering apparatus, the steering auxiliary torque of the electric motor 116 is applied to the output shaft 105 via the worm wheel 118, and consequently larger torsional torque than on the input shaft 104 disposed on the rear side of the vehicle occurs on this output shaft 105 when in a steady state.

Moreover, if a reverse input, e.g., an impact force generated as when a tire collides with a curbstone acts on the output shaft 105 from the steering gear side, the worm wheel 118 has motor inertia that increases with a square of a gear ratio, and hence the extremely large impact torsional torque occurs on the output shaft 105.

The electric power steering apparatus according to the prior art shown in FIG. 8 has the hollowed structure that the torsion bar 111 extends through within the output shaft 105, and the torsion bar 111 is fixedly press-fitted in the end portion of the output shaft 105. Hence, if a small-diameter portion 105a of the output shaft 105 connected to a universal joint of the steering gear is twisted by the aforementioned torsional torque to an extremely slight degree in excess of an elasticity limit, its torsion (rotation) is detected by a torque sensor and appears to be an output deviation of the torque sensor, wherein this output deviation might induce self-steering. It is therefore required that strength of the small-diameter portion 105a of the output shaft 105 be improved by effecting a thermal treatment upon this small-diameter portion 105a.

DISCLOSURE OF THE INVENTION

It is an object of the present invention, which was devised under such circumstances described above, to provide an electric power steering apparatus capable of increasing a collapse/stroke quantity when a secondary collision of a vehicle happens by reducing an axis-directional length.

To accomplish the above object, an electric power steering apparatus according to the present invention comprises a steering shaft including an input shaft connected to a steering wheel, an output shaft connected to a steering gear device, a torsion bar for transferring torque to the output shaft from the input shaft, the steering shaft being rotatably supported in a steering column through bearings respectively at a vehicle-rear-sided portion and a vehicle-front-sided portion, torque detection coils disposed apart outwards in a radial direction of the steering shaft, and a worm wheel meshing with a worm rotationally driven by a motor driven corresponding to detected torque and fixed to the output shaft in terms of its rotation, wherein the vehicle-front-sided bearing is constructed of a first bearing provided between a column-sided member and a vehicle-rear-sided portion of the worm wheel, and of a second bearing for supporting the steering shaft on a more front side than the worm wheel.

In the electric power steering apparatus according to the present invention, it is preferable that the worm wheel is provided with a boss protruding towards the rear of a vehicle, the bearing is supported on an outer periphery of the boss, a vehicle-front-sided end portion of the sleeve extending in an axial direction so as to encompass an outer periphery of the steering shaft inwards in the radial direction of the boss, is fixed to the output shaft, and the torque detection coils are supported on the sleeve.

According to the present invention having such a construction, the axis-directional length of the housing of the electric power steering can be reduced, whereby there can be increased the collapse/stroke quantity when the secondary collision of the vehicle happens.

Further, in the electric power steering apparatus according to the present invention, preferably, the input shaft is formed with a hollowed portion opened in the front of the vehicle, having its front side end provided inwards in the radial direction of the boss of the worm wheel and extending in the axial direction, and the torsion bar extends in the axial direction within the hollowed portion.

Moreover, in the electric power steering apparatus according to the present invention, preferably, a vehicle-front-sided end portion of the torsion bar is fixed to a vehicle-rear-sided end portion of the output shaft, and the vehicle-rear-sided end portion of the torsion bar is fixed to the input shaft by use of a pin.

Still further, in the electric power steering apparatus according to the present invention, preferably, an outer periphery of the input shaft is formed with grooves that face the torque detection coils.

Yet further, in the electric power steering apparatus according to the present invention, preferably, the sleeve is formed with windows that face the coils.

BRIEF DESCRIPTION OF THE DRAWINGS

FIG. 5A is a sectional view of the torque sensor; FIG. 5B is a sectional view taken along the line b-b in FIG. 5A;

EMBODIMENTS OF THE INVENTION

An electric power steering apparatus according to embodiments of the present invention will hereinafter be described with reference to the drawings.

First Embodiment

Figure 1:
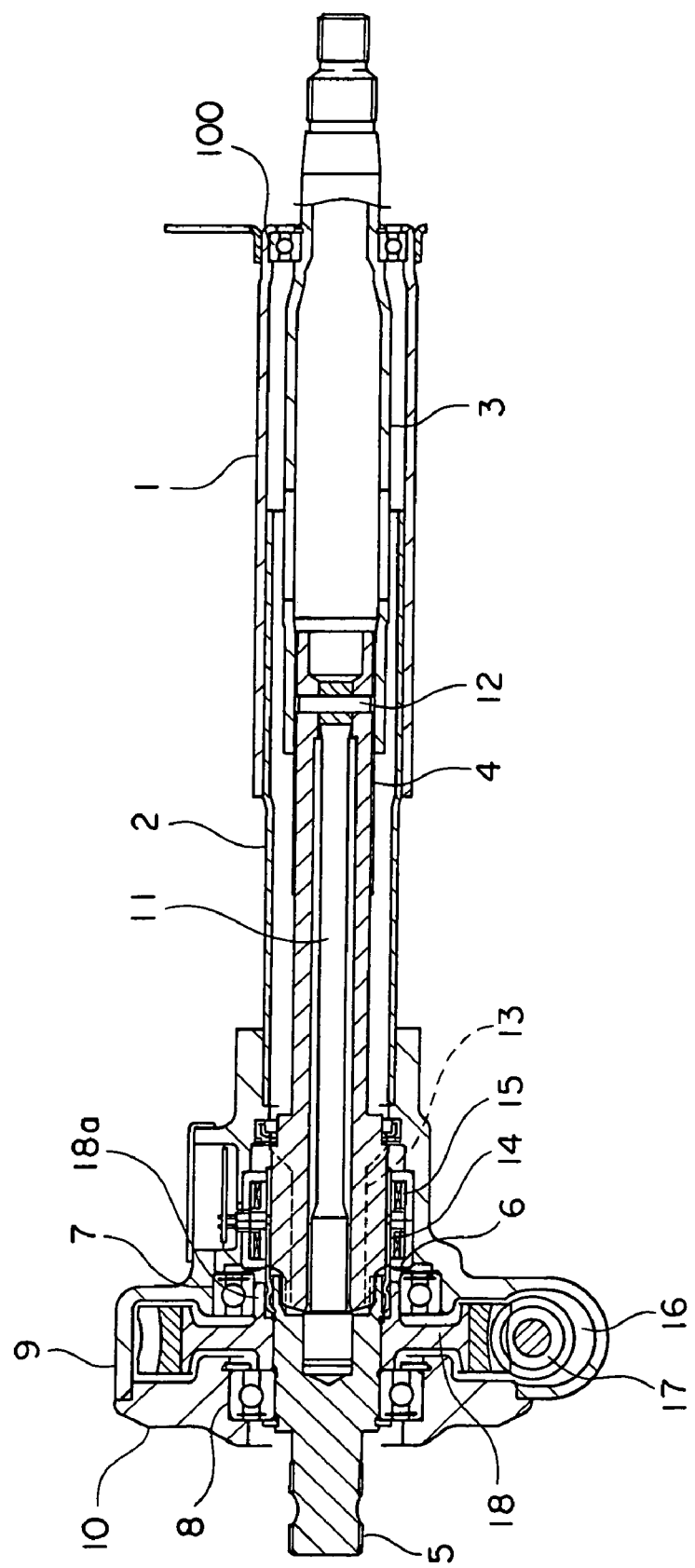
FIG. 1 is a vertical sectional view of an electric power steering apparatus according to a first embodiment of the present invention.

FIG. 1 is a vertical sectional view of the electric power steering apparatus according to a first embodiment of the present invention.

Figure 2:
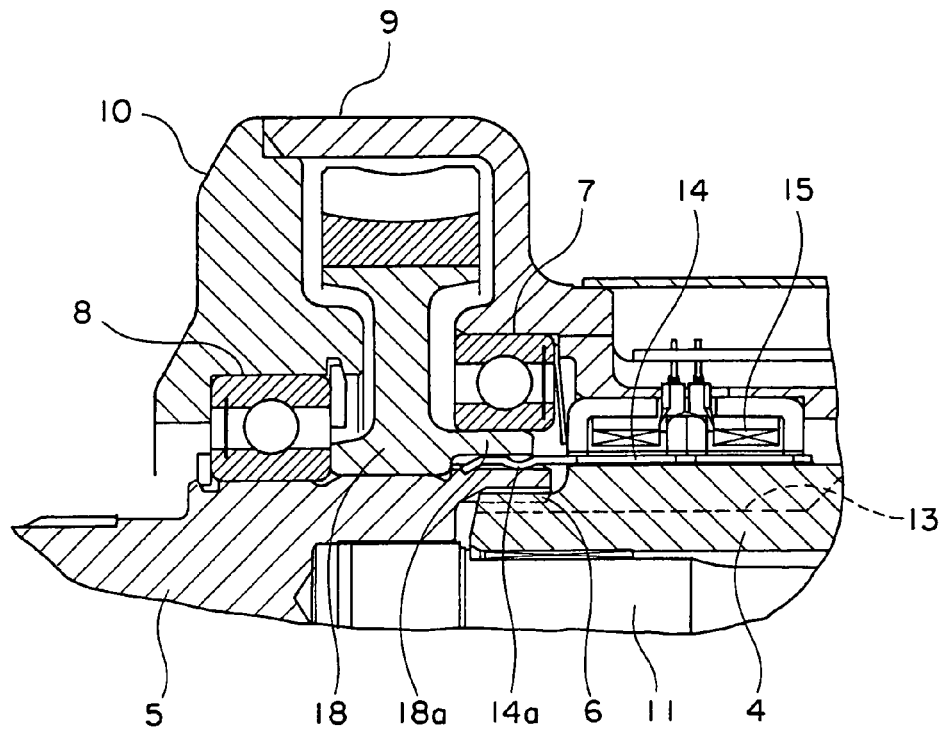
FIG. 2 is an enlarged sectional view of a principal portion of the electric power steering apparatus illustrated in FIG. 1.

FIG. 2 is an enlarged sectional view of a principal portion of the electric power steering apparatus illustrated in FIG. 1.

Figure 3:
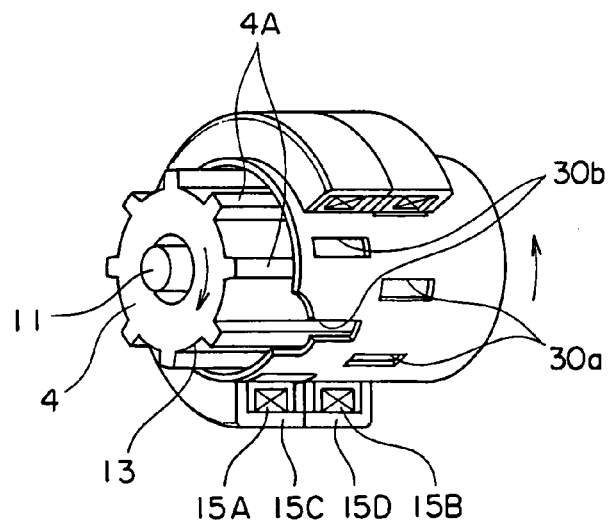
FIG. 3 is a partially cut-off perspective view of a torque sensor.

FIG. 3 is a partially cut-off perspective view of a torque sensor.

Figure 4:
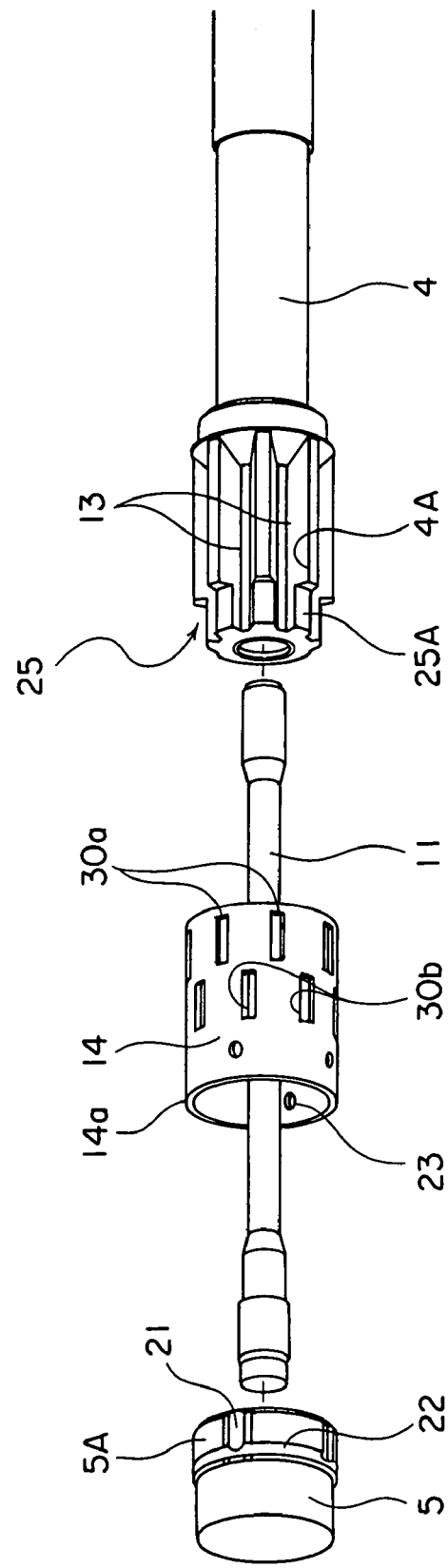
FIG. 4 is an exploded perspective view of the torque sensor.

FIG. 4 is an exploded perspective view of the torque sensor.

FIG. 5A is a sectional view of the torque sensor. FIG. 5B is a sectional view taken along the line b-b in FIG. 5A.

As illustrated in FIG. 1, in the electric power steering apparatus according to the first embodiment, a lower column 2 is fitted in a portion, on the front side of a vehicle, of an upper column 1 of a steering column, and a steering shaft is, through a bearing 100 on the rear side of the vehicle, supported rotatably via bearings 7, 8 on the front side of the vehicle as will be mentioned later on. The steering shaft is constructed of an upper shaft 3, a lower shaft 4 (input shaft) that are spline-fitted to each other, an output shaft 5 which will be described later on, a torsion bar 11 connected between the lower shaft 4 (input shaft) and the output shaft 5, and so on.

A portion, on the rear side of the vehicle, of the output shaft 5 is connected to a portion, on the front side of the vehicle, of the lower shaft (input shaft) 4 via a stopper portion 6 as will be explained later on. A steering gear (unillustrated) is connected via a universal joint (not shown) to the vehicle-front-sided portion of the output shaft 5. Note that the input shaft 4 is made of a magnetic material such as iron, etc.

Housing is integral with the columns 1, 2 and constitutes a column-sided member. A proximal side end of the torsion bar 11 is fixedly press-fitted to the vehicle-rear-sided portion of the output shaft 5. The torsion bar 11 extends through an interior of the hollowed lower shaft (input shaft) 4, and an end which is a vehicle-rear-sided end portion, of the torsion bar 11 is fixed to an end portion of the lower shaft (input shaft) 4 by use of fixing pin 12. The fixing pin 12 is disposed in the hollowed upper shaft 3 and, with this contrivance, can be prevented from being removed. It should be noted that the torsion bar 11 is disposed closer to the rear side of the vehicle than a position of a worm wheel 18.

Grooves 13 for detecting torque are formed in a vehicle-front-sided portion of the lower shaft (input shaft) 4, and a sleeve 14 of the torque sensor is disposed outwards in radial directions of these grooves 13. In this sleeve 14, a vehicle-front-sided end portion 14a thereof is fixed to the vehicle-rear-sided end portion of the output shaft 5 by caulking or the like. A coil 15 for detecting the torque and a board are provided outwards in the radial direction of the sleeve 14.

The worm wheel 18 meshing with a worm 17 defined as a drive shaft of an electric motor 16 is fixedly fitted to the output shaft 5.

Accordingly, a steering force generated when a driver steers the steering wheel (unillustrated) attached to a rear side end of the upper shaft 3, is transferred to unillustrated steered travelling wheels via the input shaft 4, the torsion bar 11, the output shaft 5 and a rack-and-pinion steering gear. Further, a rotational force of the electric motor 16 is transferred to the output shaft 5 via the worm 17 and the worm wheel 18 meshing with the worm 17. An adequate amount of steering auxiliary torque can be applied to the output shaft 5 by properly controlling the rotational force of the electric motor 16 and a rotational direction of meshing therewith.

Moreover, as shown in FIG. 2, according to the first embodiment, the worm wheel 18 is formed integrally with a concentric cylindrical boss portion 18a protruding towards the rear side of the vehicle. The bearings 7, 8 are disposed at the vehicle-rear-and-front-sided portions of the worm wheel 18. The bearing 7 provided at the vehicle-rear-sided portion is supported on an outer periphery of the boss portion 18a of the worm wheel 18, and is disposed between the outer periphery of the boss portion and a housing member 9. The vehicle-front-sided end portion 14a of the sleeve 14 is fixedly fitted on the vehicle-rear-sided end portion of the output shaft 5 inwardly in the radial direction of the boss portion 18a of the worm wheel 18. It is therefore possible to reduce a length of the housing in the axial direction, which is constructed of the housing member 9 and a housing member 10. This lengthwise reduction thereof makes it feasible to increase a collapse/stroke quantity when a secondary collision of the vehicle happens. The vehicle-front-sided bearing 8 of the worm wheel 18 is provided adjacent to the worm wheel 18 between the output shaft 5 and the housing member 10.

The torsion bar 11 is disposed at the vehicle-rear-sided portion of the worm wheel 18, wherein large torsional torque does not occur both when in a steady state and when in a reverse input, thereby enabling safety to be improved with no possibility of causing a deviation in output of the torque sensor and enabling the cost to be decreased because of necessitating none of a thermal treatment.

Next, as shown in FIG. 4, a large-diameter portion 4A coaxial with the input shaft 4 is formed on an outer peripheral surface of the vehicle-front-sided portion of the input shaft 4, and the aforementioned thin sleeve 14 is so disposed in close proximity to the outer peripheral surface of the large-diameter portion 4A as to embrace this large-diameter portion 4A.

The sleeve 14 is made of a conductive but non-magnetic material (e.g., aluminum), and a vehicle-front-sided end portion of the sleeve 14 is fixed to the vehicle-rear-sided end portion of the output shaft 5.

To be specific, as shown in FIGS. 4, 5A and 5B, a large-diameter portion 5A is formed on the vehicle-rear-sided end portion of the output shaft 5, and an outer peripheral surface of this large-diameter portion 5A is formed with a plurality of axis-directional grooves 21 (four lines of grooves are provided in this example) extending in the axial direction and with a periphery-directional groove 22 continuous in a peripheral direction.

The respective axis-directional grooves 21 are so formed extending over the entire length of the large-diameter portion 5A as to be apart from each other at equal intervals (90 degrees) in the peripheral direction. Further, the periphery-directional groove 22 is formed in the vicinity of where the end portion 14a of the sleeve 14 is positioned when fixing the sleeve 14.

Along an inner peripheral surface of the sleeve 14, a plurality of semi-spherical protrusions 23 are formed inwards in the radial direction (four pieces are provided in this embodiment) in positions slightly receded from an end portion of the sleeve 14. The number and forming positions of these protrusions 23 correspond to the axis-directional grooves 21 of the output shaft 5, and therefore the protrusions 23 are disposed apart from each other at the equal intervals (90 degrees) in the peripheral direction. Further, a height of the protrusion 23 is much the same as a depth of the axis-directional groove 21.

When fixing the sleeve 14 to the large-diameter portion 5A of the output shaft 5, the protrusions 23 are fitted in the axis-directional grooves 21, thereby positioning the sleeve 14 with respect to the output shaft in the peripheral direction. Then, the sleeve 14 is intruded in the axial direction, the end portion of the sleeve 14 is set in close proximity to the periphery-directional groove 22. In this state, the end portion of the sleeve 14 is caulked inwards and thus gets bitten in the periphery-directional groove 22. Namely, the periphery-directional position of the sleeve 14 with respect to the output shaft 5 is fixed by fitting the protrusions 23 in the axis-directional grooves 21. The axis-directional position of the sleeve 14 with respect to the output shaft 5 is fixed by getting the end portion 14a thereof bitten in the periphery-directional groove 22.

On an inside-diameter side of the worm wheel 18, a spline hole 5B is, as shown in FIG. 5A, coaxially formed in the vehicle-rear-sided end portion of the output shaft 5, whereby the vehicle rear-sided end portion of the torsion bar 11 is fixedly held through spline-connection. A female stopper 24 (a stopper portion 6) is formed in an inner peripheral surface of the cylindrical large-diameter portion 5A closer to the end surface than the spline hole 5B. The female stopper 24 is a hole including eight pieces of recessed portions 24A formed such that the inner peripheral surface is recessed (in eight positions) outwards in the radial direction.

As shown in FIG. 4, a male stopper 25 (a stopper portion 6) is formed, corresponding to the female stopper 24, on an end portion of the input shaft 4. The male stopper 25 is a shaft having eight pieces of protruded portions 25A formed such that the outer peripheral surface is protruded (in eight positions) outwards in the radial direction, wherein a periphery-directional width of each protruded portion 25A is slightly smaller than a periphery-directional width of the recessed portion 24A. With this contrivance, a relative rotation between the input shaft 4 and the output shaft 5 is regulated within a range of a predetermined angle (approximately ±5 degrees). Thus, when the torque transferred between the input shaft 4 and the output shaft 5 exceeds a predetermined value, the male stopper 25 butts against the female stopper 24, thereby directly transferring the torque through the stopper portion 6.

On the other hand, a portion of the sleeve 14 that embraces the large-diameter portion 4A of the input shaft 4 after assembling the sleeve 14, is formed with a plurality of rectangular windows 30a spaced away from each other at equal intervals in the peripheral direction on a remote side from the protrusions 23, and with a plurality of rectangular windows 30b spaced away from each other at equal intervals in the peripheral direction on a close side to the protrusions 23 so as to shift in phase at 180 degrees from the windows 30a, ..., 30a (to describe it at an actual angle, the windows 30b are shifted in phase at $(360/n \times \frac{1}{2})$ degrees from n-pieces of windows 30a).

In association with this, the large-diameter portion 4A of the input shaft 4 has a plurality of grooves 13 formed at equal intervals extending in the axial direction. The number of the grooves 13 is, however, the same as the number of the windows 30a and the number of the windows 30b.

When there does not occur the relative rotation between the input shaft 4 and the output shaft 5 (when the steering torque is zero), the input shaft 4 and the sleeve 14 are positioned so that a phase between the center of each groove 13 in a widthwise direction and a center of the window 30a in the widthwise direction is 90 degrees and so that a phase between the center of each groove 13 in the widthwise direction and a center of the window 30b in the widthwise direction is 90 degrees in the opposite direction (to describe it at an actual angle, they are positioned so that there is made an angle of $(360/n \times \frac{1}{4})$ degrees to the center of each of n-pieces of grooves 13 in the widthwise direction).

Namely, when assembling the input shaft 4, the output shaft 5, the torsion bar 11 and the sleeve 14, it is required that the phases of the input shaft 4 and the sleeve 14 be adjusted so that overlapped states between the grooves 13 and the windows 30a and between the grooves 13 and the windows 30b become as described above. However, the sleeve 14 is fixed to the output shaft 5, and the input shaft 4 and the output shaft 5 are connected to each other through the torsion bar 11. A phase relationship between the respective portions is determined as follows.

To start with, when the steering torque is zero, the male stopper 25 formed on the input shaft 4 and the female stopper 24 formed in the output shaft 5 are engaged in a neutral position, i.e., the protruded portion 25A may be positioned in a central portion of the recessed portion 24A. Therefore, a periphery-directional position of each protruded portion 25A of the male stopper 25 is set as a fiducial position when considering the phases of the respective portions of the input shaft 4, and a periphery-directional position of each recessed portion 24A of the female stopper 24 is set as a fiducial position when considering the phases of the respective portions of the output shaft 5.

As for the input shaft 4, the periphery-directional positions of the grooves 13, ..., 13 formed in the large-diameter portion 4A are determined based on the protruded portions 25A. In this connection, as for the output shaft 5, the periphery-directional positions of the axis-directional grooves 21, ..., 21 formed in the outer peripheral surface of the large-diameter portion 5A are determined based on the recessed portions 24A.

Further, as for the sleeve 14, the periphery-directional positions of the respective windows 30a, ..., 30a and 30b, ..., 30b are determined based on the protrusions 23. When the periphery-directional positions of the individual portions are thus determined, the phase relationship between the grooves 13, ..., 13 and the windows 30a, ..., 30 and 30b, ..., 30b is established as described above by performing the neutral alignment of the stoppers even if the phase adjustment of the sleeve 14 is not particularly conducted on the occasion of assembling.

A working accuracy of each portion is extremely important in order to surely acquire the phase relationship given above. Such being the case, according to the first embodiment, as for the input shaft 4, the grooves 13 and the male stopper 25 are formed by cold forging integrally with the input shaft 4, and, as for the output shaft 5, the grooves 21 are formed by cold forging integrally with the output shaft 5.

Moreover, as shown in FIG. 3, yokes 15C, 15D made of a magnetic material, which support, on their inner peripheral side, a bobbin wound with coils 15A, 15B based on the same specifications so as to encompass the sleeve 14, are fixed inwardly of the housing member 9. The coils 15A, 15B are, however, coaxial with the sleeve 14, wherein one coil 15A encompasses the portion of the sleeve 14 that is formed with the windows 30a, ..., 30a, and the other coil 15B encompasses the portion of the sleeve 14 that is formed with the windows 30b, ..., 30b.

End portions of the respective coils 15A, 15B are connected to the board accommodated in the housing, and an unillustrated motor control circuit is built up on the board. A specific construction of the motor control circuit is not the gist of the present invention, and therefore its detailed explanation is not given herein. For instance, however, as disclosed in Japanese Patent Application Laid-Open Publication No. 8-240491, the motor control circuit can be constructed of an oscillation unit for supplying the coils 15A, 15B with an alternate current having a predetermined frequency, a first rectification smoothing circuit for rectifying, smoothing and thus outputting a self-induced electromotive force of the coil 15A, a second rectification smoothing circuit for rectifying, smoothing and thus outputting a self-induced electromotive force of the coil 15B, a differential amplifier for amplifying and thus outputting a difference in output between the first and second rectification smoothing circuits, a noise removing filter for removing high-frequency noises from an output of the differential amplifier, a torque calculation unit for obtaining the steering torque generated in the steering system by calculating a direction and a magnitude of a relative rotation displacement between the input shaft 4 and the sleeve 14 on the basis of an output of the noise removing filter and multiplying this calculated result by, e.g., a predetermined proportional constant, and a motor drive unit for supplying the electric motor 16 with a drive current as generated by steering auxiliary torque that helps reduce the steering torque on the basis of the calculated result of the torque calculation unit.

Next, an operation in the first embodiment will be described. Supposing that the steering system is in a go-straight state and the steering torque is therefore zero, none of the relative rotation occurs between the input shaft 4 and the output shaft 5. Accordingly, the relative rotation does not occur between the input shaft 4 and the sleeve 14 either.

In contrast, when the rotational force is applied to the input shaft 4 by steering the steering wheel, the rotational force thereof is transferred to the output shaft 5 via the torsion bar 11. At this time, a frictional force generated between the steered traveling wheels and a road surface and a resistance force corresponding to a frictional force caused by gear meshing, etc. of the rack-and-pinion steering gear, occur on the output shaft 5. Hence, such a relative rotation that the output shaft 5 is retarded occurs due to the torsion bar 11 being twisted between the input shaft 4 and the output shaft 5, and a relative rotation occurs also between the input shaft 4 and the sleeve 14. Then, a direction and a quantity of this relative rotation are determined depending on the steering direction of the steering wheel and on the generated steering torque.

When the relative rotation occurs between the input shaft 4 and the sleeve 14, the overlapped states between the grooves 13 and the windows 30a, ..., 30a and between the grooves 13 and 30b, ..., 30b changes from the initial state, and the phase relationship between the windows 30a, ..., 30a and the windows 30b, ..., 30b is set as described above. Therefore, the overlapped state between the grooves 13 and the windows 30a, ..., 30a and the overlapped state between the grooves 13 and the windows 30b, ..., 30b change in the directions opposite to each other.

As a result, a self-inductance of the coil 15A and a self-inductance of the coil 15B change in the directions opposite to each other in accordance with the relative rotation between the input shaft 4 and the sleeve 14, and hence the self-induced electromotive forces of the coils 15A and 15B change in the directions opposite to each other. Accordingly, when obtaining a difference between the self-induced electromotive forces of the coils 15A and 15B, this difference linearly changes depending on the direction and the magnitude of the steering torque. On the other hand, a change in the self-inductance, which is caused due to a temperature, etc., is cancelled in the differential amplifier within the motor control circuit.

The torque calculation unit in the motor control circuit obtains the steering torque based on an output of the differential amplifier, and the motor drive unit supplies the electric motor 16 with the drive current corresponding to the direction and the magnitude of the steering torque. Then, a rotational force corresponding to the direction and the magnitude of the steering torque generated in the steering system, is generated in the electric motor 16 and transferred to the output shaft 5 via the worm 18 and the worm wheel 18. Therefore, it follows that the steering auxiliary torque is applied to the output shaft 5 to reduce the steering torque, and a load on the driver is relieved.

According to the first embodiment, the end portion of the output shaft 5 is formed with the plurality of axis-directional grooves 21 and with the periphery-directional groove 22, the protrusions 23 of the sleeve 14 are fitted in the axis-directional groves 21, and the end portion of the sleeve 14 is caulked and thus gets bitten in the periphery-directional groove 22. Hence, it does not happen that a holding force decreases due to a difference in thermal expansion coefficient even between the members made of different materials as between the iron output shaft 5 and the aluminum sleeve 14. It is therefore possible to reduce to a great degree a possibility that the relative periphery-directional position and the axis-directional position of the sleeve 14 to the output shaft 5 deviate from the initial state and these deviations might be contained in a torque detected value. Hence, the torque sensor is extremely suitable as a torque sensor for the electric power steering apparatus which high reliability is required of in terms of the safety.

Moreover, according to the first embodiment, the grooves 13 and the male stopper 25 are formed by cold forging integrally with the input shaft 4, and the axis-directional groove 21 is formed by cold forging integrally with the output shaft 5, thereby yielding advantages in which the phase adjustment can be facilitated when assembling and the aforementioned contrivance contributes to reduce the manufacturing costs.

Second Embodiment

Figure 6:
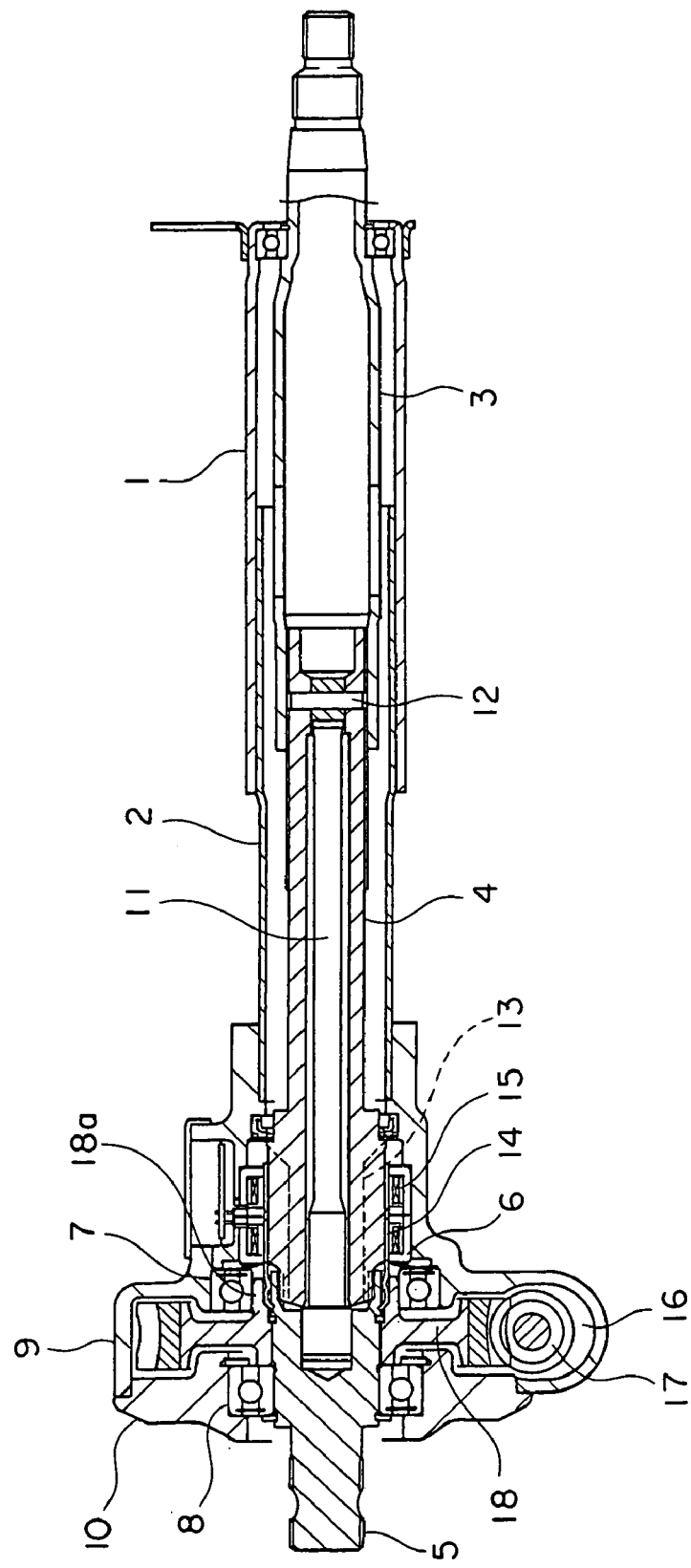
FIG. 6 is a vertical sectional view of the electric power steering apparatus according to a second embodiment of the present invention.
Figure 7:
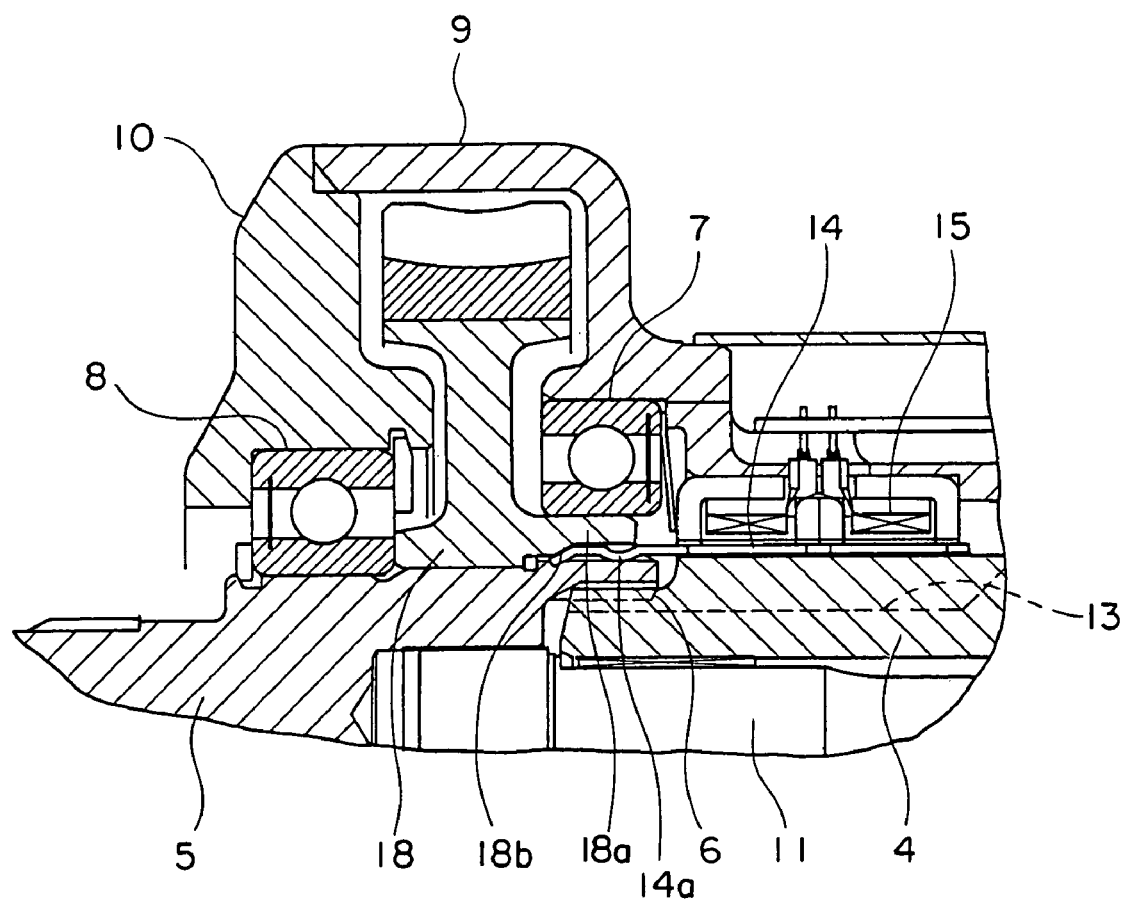
FIG. 7 is an enlarged sectional view of a principal portion of the electric power steering apparatus illustrated in FIG. 6.
Figure 8:
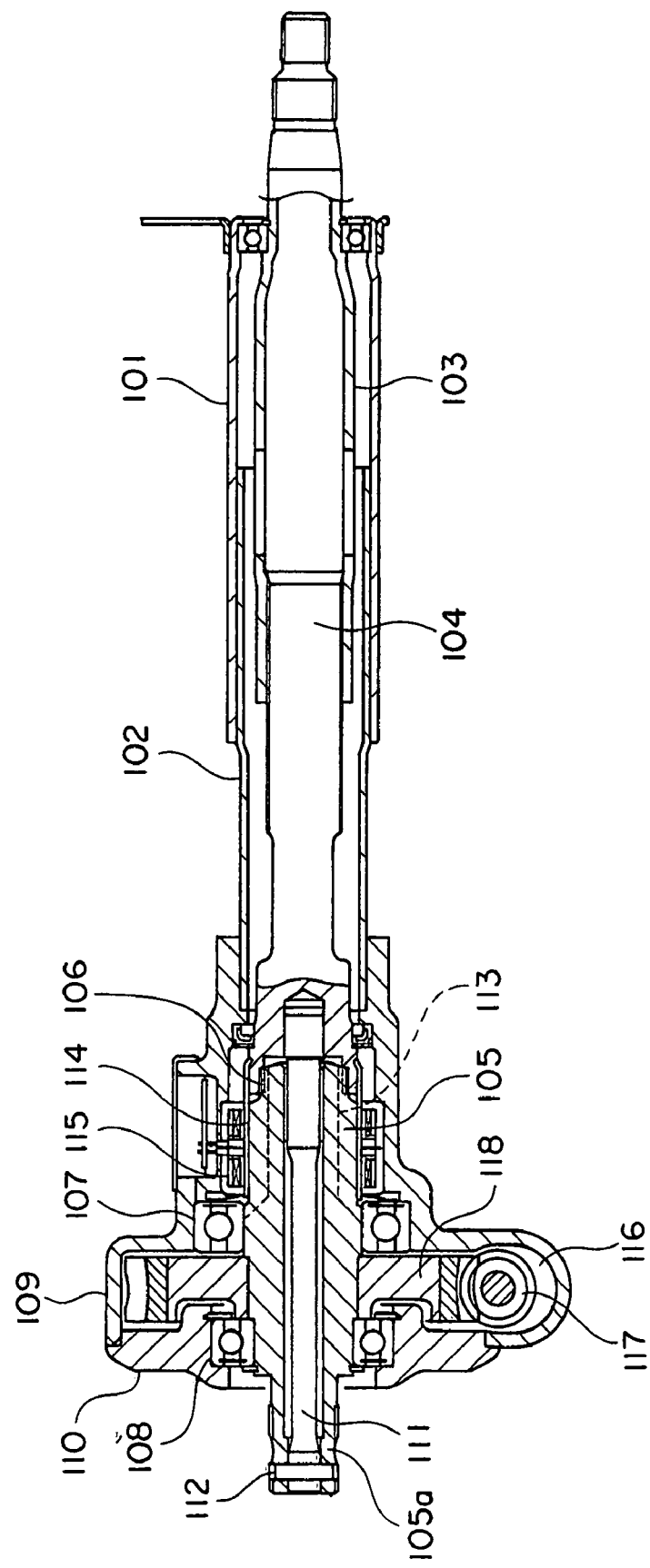
FIG. 8 is a vertical sectional view of an electric power steering apparatus according to the prior art.

FIG. 6 is a vertical sectional view of the electric power steering apparatus according to a second embodiment of the present invention. FIG. 7 is an enlarged sectional view of a principal portion of the electric power steering apparatus illustrated in FIG. 6.

According to the second embodiment, the vehicle-front-sided end portion 14a of the sleeve 14 is caulked in a way that press-fits the worm wheel 18 by making use of a tapered surface 18b provided along an inside diameter of a boss portion 18a of the worm wheel 18, whereby both of the number of steps and the costs can be reduced. Other configurations and operations are the same as those in the first embodiment discussed above.

It should be noted that the present invention is not limited to the embodiments discussed above and can be modified in a variety of forms.

As described above, the present invention enables the reduction of the axis-directional length of the housing of the electric power steering, thereby making it possible to increase the collapse/stroke quantity when the secondary collision of the vehicle happens.

What is claimed is:

1. An electric power steering apparatus comprising:
    a steering shaft including an input shaft connected to a steering wheel, an output shaft connected to a steering gear device, a torsion bar for transferring torque to said output shaft from said input shaft, said steering shaft being rotatably supported in a steering column through bearings respectively at a vehicle-rear-sided portion and a vehicle-front-sided portion;
    torque detection coils disposed apart outwards in a radial direction of said steering shaft; and
    a worm wheel meshing with a worm rotationally driven by a motor driven corresponding to detected torque and fixed to said output shaft in terms of its rotation,
    wherein said vehicle-front-sided bearing is constructed of a first bearing provided between a column-sided member and a vehicle-rear-sided portion of said worm wheel, and of a second bearing for supporting said steering shaft on a more front side than said worm wheel.

2. An electric power steering apparatus according to claim 1, wherein said worm wheel is provided with a boss protruding towards the rear of a vehicle, said first bearing is supported on an outer periphery of said boss, a vehicle-front-sided end portion of a sleeve extending in an axial direction encompasses an outer periphery of said steering shaft inwards in the radial direction of said boss and is fixed to said output shaft, and said torque detection coils are supported on said sleeve.

3. An electric power steering apparatus according to claim 2, wherein said input shaft is formed with a hollowed portion opened in the front of the vehicle, having its front side end provided inwards in the radial direction of said boss of said worm wheel and extending in the axial direction, and said torsion bar extends in the axial direction within said hollowed portion.

4. An electric power steering apparatus according to claim 3, wherein a vehicle-front-sided end portion of said torsion bar is fixed to a vehicle-rear-sided end portion of said output shaft, and the vehicle-rear-sided end portion of said torsion bar is fixed to said input shaft by use of a pin.

5. An electric power steering apparatus according to claim 4, wherein an outer periphery of said input shaft is formed with grooves that face said torque detection coils.

6. An electric power steering apparatus according to claim 5, wherein said sleeve is formed with windows that face said coils.

7. An electric power steering apparatus for a vehicle, comprising:
    a steering shaft including an input shaft connected to a steering wheel, an output shaft connected to a steering gear device, a torsion bar for transferring torque to said output shaft from said input shaft, said steering shaft being rotatably supported in a steering column through bearings respectively at a vehicle-rear-sided portion and a vehicle-front-sided portion;
    torque detection coils disposed apart outwards in a radial direction of said steering shaft; and
    a worm wheel meshing with a worm rotationally driven by a motor driven corresponding to detected torque and fixed to said output shaft in terms of its rotation,
    wherein said vehicle-front-sided bearing includes a bearing provided between said worm wheel and said steering column,
    said worm wheel is provided integrally with a bearing support portion protruding towards the rear of the vehicle, said bearing provided between said worm wheel and said steering column being supported by said bearing support portion,
    a vehicle-front-sided end portion of a sleeve extending in an axial direction encompasses an outer periphery of said steering shaft inwards in the radial direction of said bearing support portion and is fixed to said output shaft, and
    said torque detection coils are supported on said sleeve.

* * * * *